Nov. 25, 1924.

M. DELAPORTE 1,517,199

TRANSMISSION GEARING

Filed Sept. 13, 1922

Inventor-
Maurice Delaporte
By- B. Singer. Atty

Patented Nov. 25, 1924.

1,517,199

UNITED STATES PATENT OFFICE.

MAURICE DELAPORTE, OF PARIS, FRANCE.

TRANSMISSION GEARING.

Application filed September 13, 1922. Serial No. 588,025.

*To all whom it may concern:*

Be it known that I, MAURICE DELAPORTE, a citizen of France, and a resident of Paris, France, have invented some new and useful Improvements in Transmission Gearing, of which the following is a specification.

Helicoidal gears give rise to axial reactions which are compensated theoretically by the use on each of the wheels which engage together of two toothed crowns or stripes the teeth whereof are cut at opposite angles.

But the rigidity of a gearing of this commonly used type has this consequence, that slight irregularities in the cutting of the teeth are sufficient to cause momentary loss of contact of the teeth of one of the crowns or stripes. In such case the compensation of the axial reaction ceases and a relative axial displacement of the gearing is produced followed by a sudden or abrupt renewal of correct meshing and tooth contact, the transmission creating frequent noises on this account.

On the other hand, to drive the pinion by means of a ratchet coupling, as commonly used, or any other known kind of coupling, is equally a source of noise, because the unavoidable displacements, which are to be corrected by the couplings create normal strains on the shaft of the pinion, which cause the latter to vibrate in its bearings. Of the known coupling means a flexible shaft seems the only one, that evades this inconvenience.

The present invention has for its main object a new process, which evades the loss of contact of the teeth and at the same time uses the suitable coupling of a flexible arbor.

Seeing, that a device is known, which until now has been used to reduce only the torque of the pinion, it is possible to make the pinion in two parts, of which each carries a crown and which are united by a shaft.

The new process uses this device, but with an essential correction: The shaft which unites the two parts of the pinion receives the shape of a hollow tube with thin walls. It follows that the shaft has a great twisting movement and that the two crowns become capable of angular displacement under the influence of a variation in the strains transmitted by each of them. It follows further, that it is possible to arrange the flexible shaft, which is known as the best coupling means, in the interior of the hollow shaft.

Figure 1:
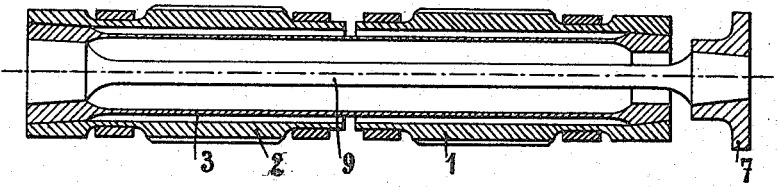
Figure 2:
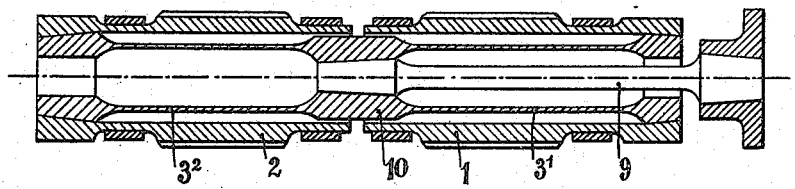

The Figures 1 and 2 show as an example forms of the invention.

In these figures the pinion consists of two distinct parts 1 and 2. Each part carries a crown. The parts are united by a shaft 3, which can be twisted, in the shape of a tube with thin walls and a flexible shaft 4 transmits the power from a coupling 5 to the hollow shaft 3.

According to Figure 1 the flexible shaft traverses the hollow shaft 3 in its entire length.

According to Figure 2 the flexible shaft 9 is connected to the hollow shaft 3 on a part in the middle of the pinion on a reinforcement 10 arranged in such a manner, that elements adapted to be twisted are located at both sides of the reinforcement.

Hereby it is easy to obtain, that the simple relation of equally transmitting power from one crown to the other will create a relative angular displacement of the toothed parts 1 and 2. For instance a twentieth part of the normal power would produce a relatively corresponding displacement of one tenth of a millimeter on their periphery.

With the means of cutting teeth, which are commonly used, the irregularities in the cutting do not exceed a few hundredths of a millimeter. Therefore these irregularities can not produce a loss of contact of the teeth and can only produce very small fluctuations in the transmission of power by each of the crowns.

Each of the crowns possesses to a certain degree, a certain independence, which permits it to keep the contact with the corresponding crown of the second wheel in spite of the imperfections of the cutting. Thereby it is realized much more plainly, that the wheel, which has been made elastic, has less inertia, because it follows much quicker the action of the twisting shaft, which acts as a spring.

The above described invention has a second object. In the form shown in Fig. 2 it permits the use of two crowns, which are provided with straight teeth or helical teeth with the same inclination. In these cases the division of the power transmitted to the two crowns is not assured any more automatically by the inclination of the teeth in opposite directions. But the deformation, which takes place in the two parts of the twisting shaft, located one at the one and the other at the other side of the reinforcement, suffices to assure this division, which until now could not be obtained by any known means unless by great velocity of rotation and transmission of heavy loads.

The division takes place automatically by means of unequal fractions of the transmitted load, if the two parts of the twisting shaft are made equally resilient.

Transmissions of the kind described are usually coupled to steam turbines. The coupling 7 of the flexible shaft 9 is bolted directly to the rotor of the turbine and becomes eccentric with respect to the pinion on account of the distension of the turbine. The presence of the flexible shaft permits this eccentricity, without it having a great influence on the location of any part of the coupling in relation to the bearings and without creating any vibrations of the pinion.

This use of the transmissions makes it often desirable to use crowns with teeth cut with an incline in the same direction, in order to obtain an axial pressure on the fast rotating shaft to equalize the pressure exerted by the steam on the rotor of the turbine.

Having thus described my invention I claim:

1. The combination of a pinion made in two parts, each carrying a crown, a tubular shaft having thin walls and which unites the two parts of the pinion and a shaft which traverses the said tubular one and is provided at one end with a coupling member which transmits power from said shaft to said tubular shaft and said pinion.

2. The combination of a pinion made in two parts, each carrying a crown, a tubular shaft having thin walls and which unites the two parts of the pinion, and a shaft which traverses the said tubular one and is provided at one end with a coupling member which transmits power from said shaft to said tubular shaft and said pinion, said coupling member being arranged intermediate the ends of said tubular shaft.

3. The combination of a pinion comprising two portions each carrying a crown and provided with a bore having a tapered end, a tubular shaft having thin walls and which unites said portions of the pinion and is provided with tapered portions engaging the tapered portions of the pinion bore, and a driving shaft traversing said tubular shaft and being secured thereto.

4. The combination of a pinion comprising two portions each carrying a crown and provided with a bore having a tapered end, a tubular shaft having thin walls and which unites said portions of the pinion and is provided with tapered portions engaging the tapered portions of the pinion bore, and a driving shaft traversing said tubular shaft and being secured thereto, the said tubular shaft having a reinforced portion engaging said driving shaft.

In witness whereof I affix my signature.

MAURICE DELAPORTE.